(12) United States Patent
Habbal

(10) Patent No.: US 10,864,515 B2
(45) Date of Patent: Dec. 15, 2020

(54) AUTOMATED PIPETTE MANIPULATION SYSTEM

(71) Applicant: Walid Habbal, Santa Clarita, CA (US)

(72) Inventor: Walid Habbal, Santa Clarita, CA (US)

(*) Notice: Subject to any disclaimer, the term of this patent is extended or adjusted under 35 U.S.C. 154(b) by 280 days.

(21) Appl. No.: 15/811,548

(22) Filed: Nov. 13, 2017

(65) Prior Publication Data
US 2018/0154349 A1    Jun. 7, 2018

Related U.S. Application Data

(60) Provisional application No. 62/421,023, filed on Nov. 11, 2016.

(51) Int. Cl.
*B01L 3/02* (2006.01)
*G01N 35/10* (2006.01)

(52) U.S. Cl.
CPC .......... *B01L 3/0289* (2013.01); *B01L 3/0227* (2013.01); *G01N 35/1011* (2013.01); *B01L 3/0237* (2013.01); *B01L 2200/025* (2013.01); *G01N 2035/1013* (2013.01)

(58) Field of Classification Search
None
See application file for complete search history.

(56) References Cited

U.S. PATENT DOCUMENTS

| | | | | |
|---|---|---|---|---|
| 6,601,433 B2* | 8/2003 | Kriz | ...................... | B01L 3/0224 73/1.74 |
| 6,627,446 B1* | 9/2003 | Roach | .............. | G01N 27/44743 436/43 |
| 7,320,260 B2* | 1/2008 | Belgardt | ............... | B01L 3/0217 73/864.14 |
| 8,372,356 B2* | 2/2013 | Warhurst | .............. | B01L 3/0227 422/509 |
| 8,486,714 B2* | 7/2013 | Favuzzi | ................... | G01N 1/30 422/50 |
| 8,646,343 B2* | 2/2014 | Kimura | ................. | B01L 3/0224 73/864.18 |
| 9,360,493 B1* | 6/2016 | Seguin | ................... | B01L 3/0279 |
| 9,821,306 B2 | 11/2017 | Zucchelli | | |
| 2001/0019845 A1* | 9/2001 | Bienert | ................... | B01L 3/021 436/181 |
| 2003/0215360 A1* | 11/2003 | Ruddock | ............... | B01L 3/0279 422/63 |

(Continued)

*Primary Examiner* — Jill A Warden
*Assistant Examiner* — Brittany I Fisher
(74) *Attorney, Agent, or Firm* — Louis F. Teran

(57) ABSTRACT

The automated pipette manipulation system of the present invention allows for the automated manipulation of any pipette commercially available to aspire and dispense liquids in a chemical or biochemical laboratory setting. Measuring the amount of liquid aspired or dispensed by a pipette is conducted by a load sensor that records the starting point of the displacement of a pushbutton of said pipette and a motor that drives the displacement of said pushbutton a predetermined distance past the starting point that corresponds to a predetermined volume of liquid aspired or dispensed by said pipette. The automated pipette manipulation system of the present invention further detects whether a pipette tip is attached to said pipette and then automatically ejects said pipette tip at the end of a liquid handling process.

9 Claims, 6 Drawing Sheets

(56) References Cited

U.S. PATENT DOCUMENTS

| | | | |
|---|---|---|---|
| 2004/0033554 A1* | 2/2004 | Powers | G01N 35/028 |
| | | | 435/29 |
| 2006/0178578 A1 | 6/2006 | Tribble | |
| 2009/0055131 A1 | 2/2009 | Bukshpan | |
| 2011/0209564 A1* | 9/2011 | Von Beichmann | B01L 9/00 |
| | | | 73/864.01 |
| 2011/0296931 A1* | 12/2011 | Warhurst | B01L 3/0227 |
| | | | 73/864.01 |
| 2012/0046883 A1* | 2/2012 | Ayliffe | B01L 3/021 |
| | | | 702/26 |
| 2012/0073389 A1* | 3/2012 | Herve | G01N 9/00 |
| | | | 73/864.21 |
| 2013/0047751 A1* | 2/2013 | Voss | G01N 35/1011 |
| | | | 73/864.01 |
| 2013/0095508 A1* | 4/2013 | Campitelli | B01L 3/0217 |
| | | | 435/7.94 |
| 2013/0280143 A1* | 10/2013 | Zucchelli | B01L 3/0237 |
| | | | 422/501 |
| 2015/0127157 A1* | 5/2015 | Matsukuma | B25J 9/1682 |
| | | | 700/258 |
| 2016/0291049 A1 | 10/2016 | Arumugan | |
| 2017/0128932 A1* | 5/2017 | Ito | B01L 3/0224 |

* cited by examiner

AUTOMATED PIPETTE MANIPULATION SYSTEM

This document claims priority to Provisional Patent Application No. 62/421,023 filed on Nov. 11, 2016.

FIELD OF INVENTION

The present invention relates to an automated pipette manipulation system used in chemical and biochemical laboratories. More particularly, the present invention is an apparatus or methods for manipulation of a laboratory pipette in a programmable manner allowing the user to instruct the device to transfer fluid in one receptacle to another.

DESCRIPTION OF PRIOR ART

A wide variety of automated diagnostic instruments are used in chemical and biochemical laboratories. In particular, liquid handling constitutes a fundamental building block in most tests performed in said laboratories. Liquid handling is defined as the operation of putting one sample in contact with another while being able to quantify the amount of liquid used. Typically, liquid handling is performed either manually by human operators or by means of automatic devices of various types. In the most conventional laboratories, liquid handling is performed with pipettes. Pipettes are typically adjustable volumetrically to transport liquid in a known amount pre-defined by the operator. Two main types of pipettes are commercially available: electronic pipettes and mechanical pipettes. Electronic pipettes present advantages in terms of calibration and ergonomics. However, mechanical pipettes still represent a large fraction of the market because they are more economical, robust, and simpler to operate.

Pipettes are one of the most widely used devices in chemical and biochemical laboratories. Precision pipettes have made chemical assays accurate and reproducible. Over the years, pipettes have evolved from relatively simple straw-type structures to sophisticated devices that exhibit great degree of precision. In a typical laboratory environment, pipetting may occupy a considerable percentage of time for a technician. Pipette users perform extremely large numbers of operations to dispense measured volumes of reagents and solutions. This work requires great accuracy, in particular, precise measurement of dispensed volume and the accurate recording of the dispensed volume data.

Laboratories have now adopted automated devices to conduct much of the pipette related tasks. The advantages of these automated devices or robots include reproducibility, speed, capacity, accuracy, and cost reductions. These automated devices typically include a main platform on which well plates and other biological sample containers can be arranged. In addition, the platform typically includes a pipette tip tray anvil. The automated devices also have a movable head that is controlled by a computer system and has mechanical manipulation capability. The movable head is capable of manipulating a pipette to aspire and/or dispense liquid much like a laboratory technician would do with a manual pipette.

The cost of automated devices is linked to their complexity and cost of the components used. The features of these automated devices that have value in the market include versatility, adaptability to different laboratory settings, ease of use, and accuracy.

Automated devices like the one taught by U.S. patent application Ser. No. 15/034,442, is a system that encompasses all of the components including a pipette-like component that is incorporated into the device. Volumetric measurements in this device is conducted by sensors that are connected to a pump or motor and a liquid dispensing system. These types of systems typically provide the most accurate volumetric measuring systems because the entire system is integrated and connected. However, these systems are costly and difficult to maintain and service.

The more recent trend is for automated systems to be as the one taught by U.S. Pat. No. 9,821,306 which makes use of manual pipettes commercially available separate from the automated device. The manual pipettes attach to the movable head of the automated device. However, the use of a pipette not integrated or connected to the entire system, adversely affects the accuracy of the volumetric measurements. In essence, the pipette is no longer part of a feedback control system where a sensor connected to a motor or pump and inlet hoses accurately measure the volume of liquid dispensed by the pipette. Instead, the volumetric measurements are entirely determined by the capabilities and specifications of the separate pipette used.

To make up for the loss of accuracy, automated systems, such as the one taught by U.S. Pat. No. 9,821,306, use cameras or an automated vision system to measure the amount of volume that is aspired and dispensed by the manual pipette. However, these cameras or automated vision systems are costly, challenging to maintain and calibrate, not sufficiently robust, and sensitive to elements within a laboratory, such as temperature, dust, light, and the like.

Therefore, what is needed is an automated device that allows the use of a separate pipette and having a volumetric measuring system that is accurate, robust, and cost efficient. Unless this and other practical problems associated with automated pipette manipulation systems are solved, many laboratories will continue to sacrifice accuracy and robustness by utilizing other systems or technicians prone to human error.

SUMMARY OF THE INVENTION

Accordingly, the present invention has been made in view of the above-mentioned disadvantages occurring in the prior art. The present invention is an automated pipette manipulation system that provides an accurate, robust, and cost-efficient method of measuring volumetrically the amount of liquid aspired and dispensed.

It is therefore a primary object of the present invention to manipulate a pipette with accurate volumetric measurement of the liquid aspired and dispensed.

Another object of the present invention is to utilize a volumetric measuring system that is accurate, robust, and cost-effective. This includes not relying on cameras or an automated visual system to conduct volumetric measurements.

Yet another object of the present invention is to use any pipette commercially available, regardless of brand or manufacturer, so as to provide laboratories flexibility and choice.

A still further object of the present invention is to allow for a simple and quick calibration of the system and pipette used.

A final object of the present invention is to automate all pipetting operations from calibrating the pipette, attaching a pipette tip, aspiring and dispensing liquid, and extracting the pipette tip in the corresponding tray.

The above objects and other features and advantages of the present invention, as well as the structure and operation of various embodiments of the present invention, are described in detail below with reference to the accompanying drawings.

DESCRIPTION OF THE DRAWINGS

The accompanying drawings which are incorporated by reference herein and form part of the specification, illustrate various embodiments of the present invention and, together with the description, further serve to explain the principles of the invention and to enable a person skilled in the pertinent art make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
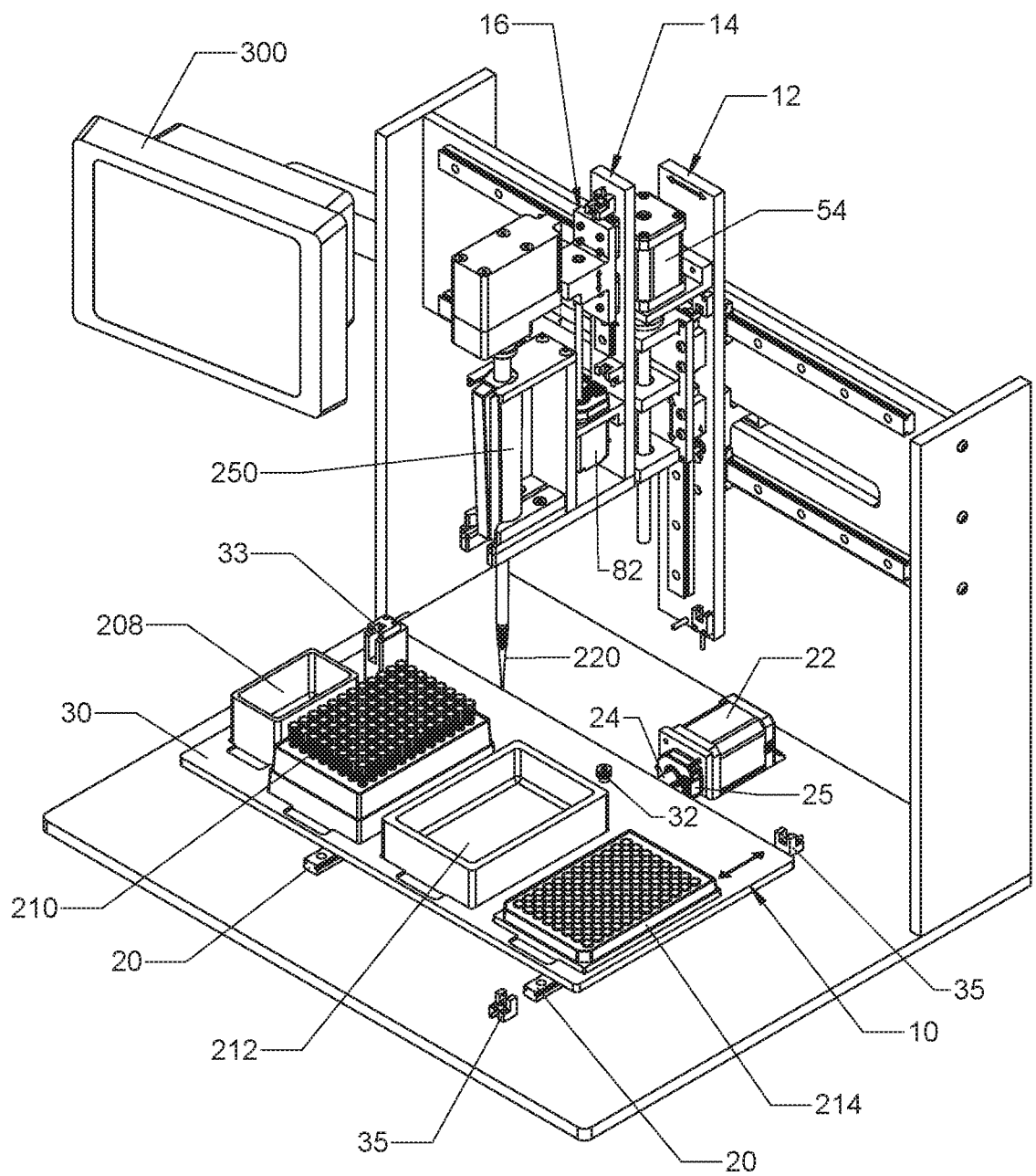
FIG. 1 is a front perspective view of the automated pipette manipulation system of the present invention in its assembled state as it would be installed and used in a laboratory setting.

Reference will now be made to the drawings in which various elements of the present invention will be given numerical designations and in which the invention will be discussed so as to enable one skilled in the art to make and use the present invention.

The present invention is an automated pipette manipulation system 500 that comprises a platform assembly 10, a head assembly 12, an actuator head assembly 14, a pipette activator 16, a pipette 250, and a microprocessor 300. The head assembly 12 allows for horizontal movement of the pipette 250 along the x-axis. The actuator head assembly 14 allows for vertical movement of the pipette 250 along the z-axis. The pipette activator 16 manipulates the pipette 250 to aspire or dispense liquid, and extract a pipette tip 220 that is attached to the pipette 250. Finally, the platform assembly 10 can be moved horizontally in the direction that is transverse of the horizontal movement of the head assembly 12, thus, along the y-axis. These mechanisms provide the automated pipette manipulation system 500 of the present invention full range of motion that can move the pipette along the x, y, and z axis. The microprocessor 300 ultimately controls the manipulation of the pipette, both its motion and its use.

Figure 2:
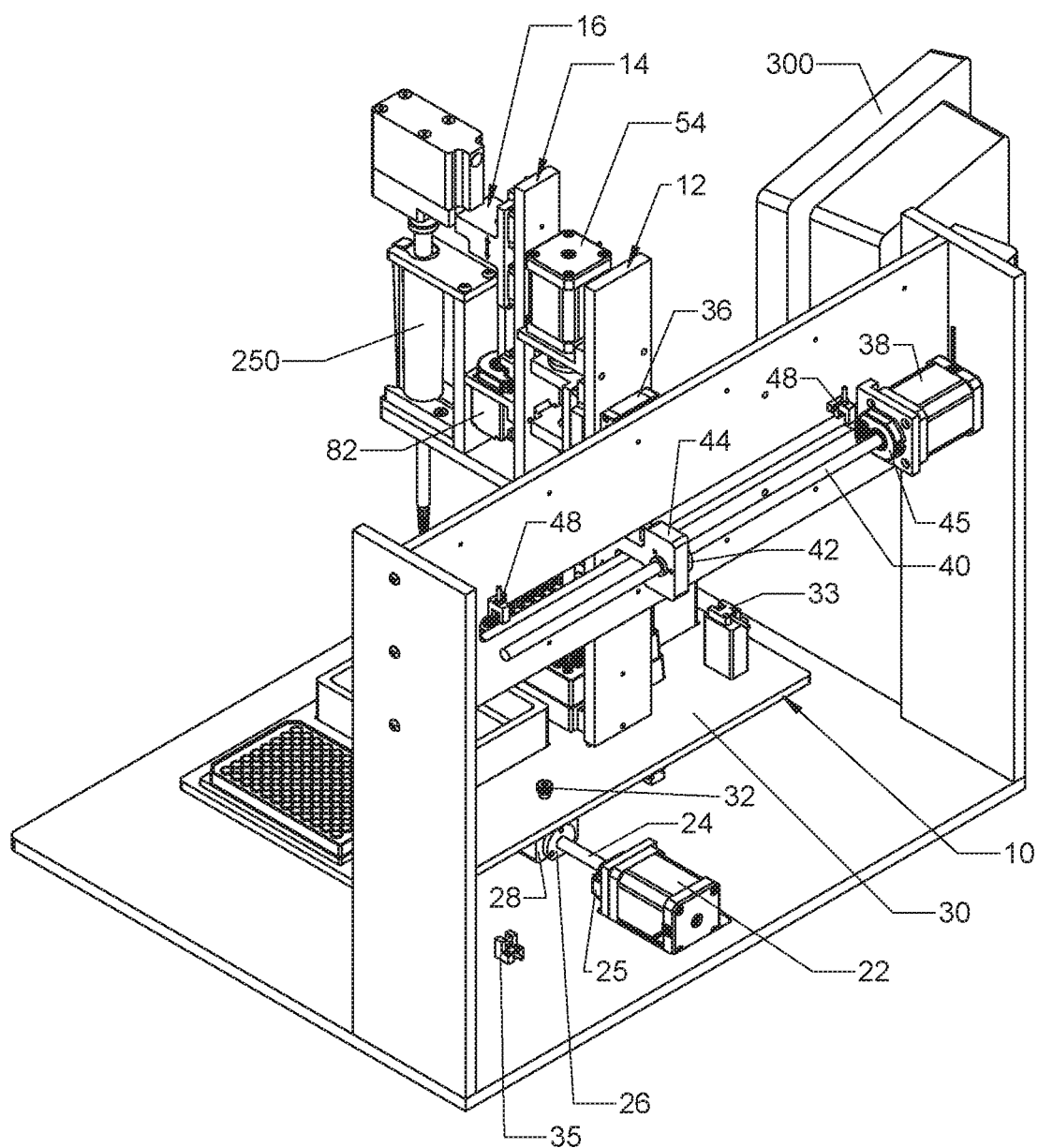
FIG. 2 is a rear perspective view of the automated pipette manipulation system of the present invention in its assembled state as it would be installed and used in a laboratory setting.

As shown in FIG. 1, the platform assembly 10 comprises a platform 30 on which various workstations rest, such as, a pipette tip disposable bin 208, a rack 210 for ready-to-use disposable pipette tips 220, a fluid reservoir 212, and a conventional microwell plate 214. The platform assembly 10 is mounted for horizontal movement on two parallel linear guides 20 by means of slide bearings. The horizontal movement is driven by a first motor 22. Therefore, as the first motor 22 turns, it rotates a first lead screw 24 that is attached to a first screw nut 26 which is fixedly attached to a support block 28, as shown in FIG. 2. The support block 28 is attached to platform 30 by a fastener 32. A sensor 33 is mounted on the platform 30 to detect whether a pipette tip 220 is attached to the pipette 250. A first encoder 25 interfaced with the first lead screw 24 records the rotational motion of the first motor 22 and the first lead screw 24. The recorded data is then used to calculate the linear position and speed of the platform assembly 10. A pair of first limit sensors 35 are interfaced with the respective ends of the path of travel of the platform assembly 10 to indicate the end of the travel.

Figure 3:
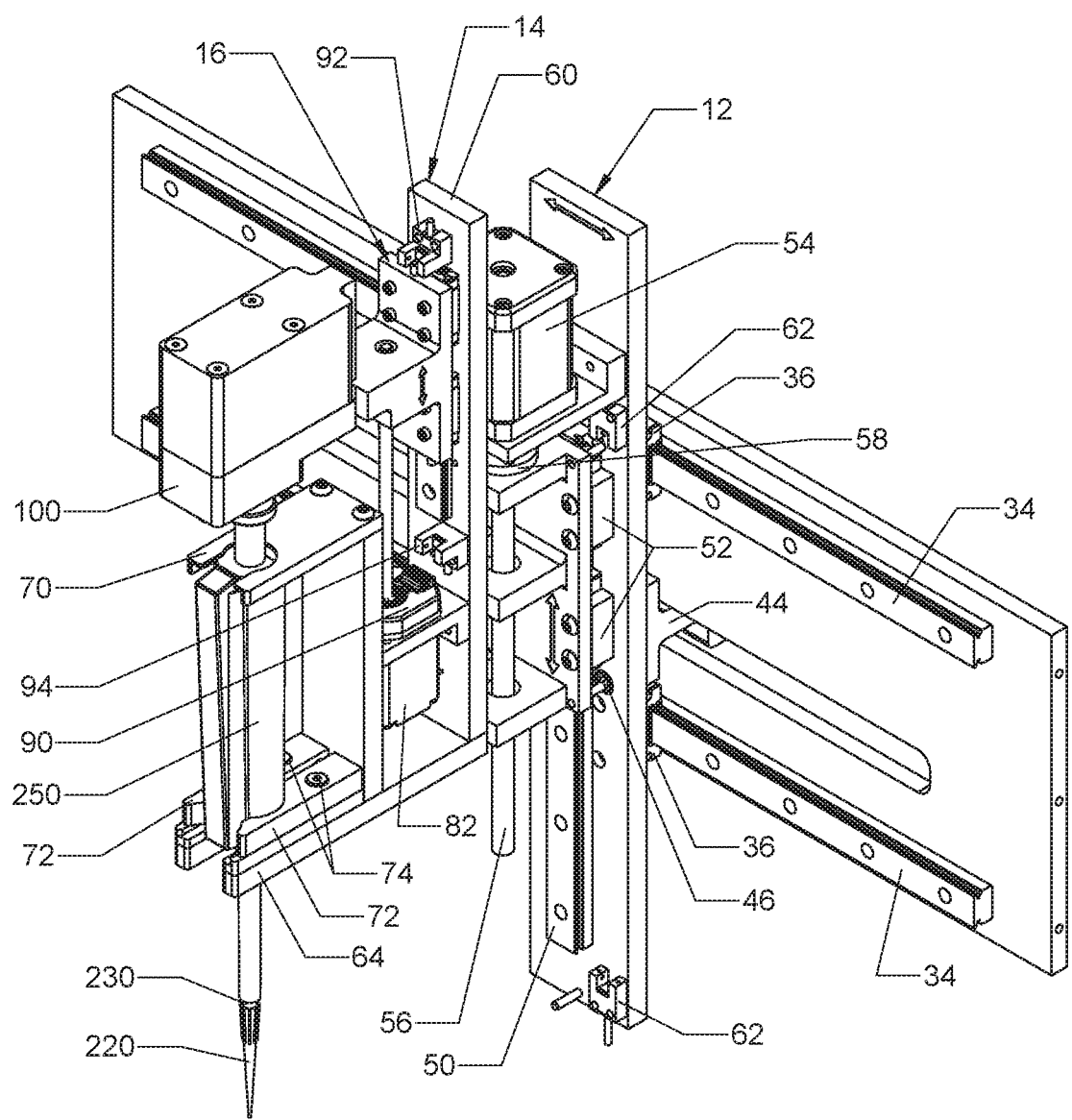
FIG. 3 is a perspective view of the actuator head assembly as it is attached to the head assembly that moves horizontally on linear guides of the present invention.

As shown in FIGS. 2 and 3, the head assembly 12 can move horizontally in a direction transverse to the movement of the platform assembly 10 on two parallel linear guides 34 by means of slide bearings 36. The horizontal movement is driven by a second motor 38. Therefore, as the second motor 38 turns, it rotates a second lead screw 40 that is attached to a second lead screw nut 42 which is fixedly attached to a plate 44. The plate 44 is then attached to the head assembly 12 with fasteners 46. A second encoder 45 interfaced with the second lead screw 40 records the rotational motion of the second motor 38 and the second lead screw 40. The recorded data is then used to calculate the linear position and speed of the head assembly 12. A pair of second limit sensors 48 are interfaced with the respective ends of the path of travel of the head assembly 12 to indicate the end of travel.

Figure 4:
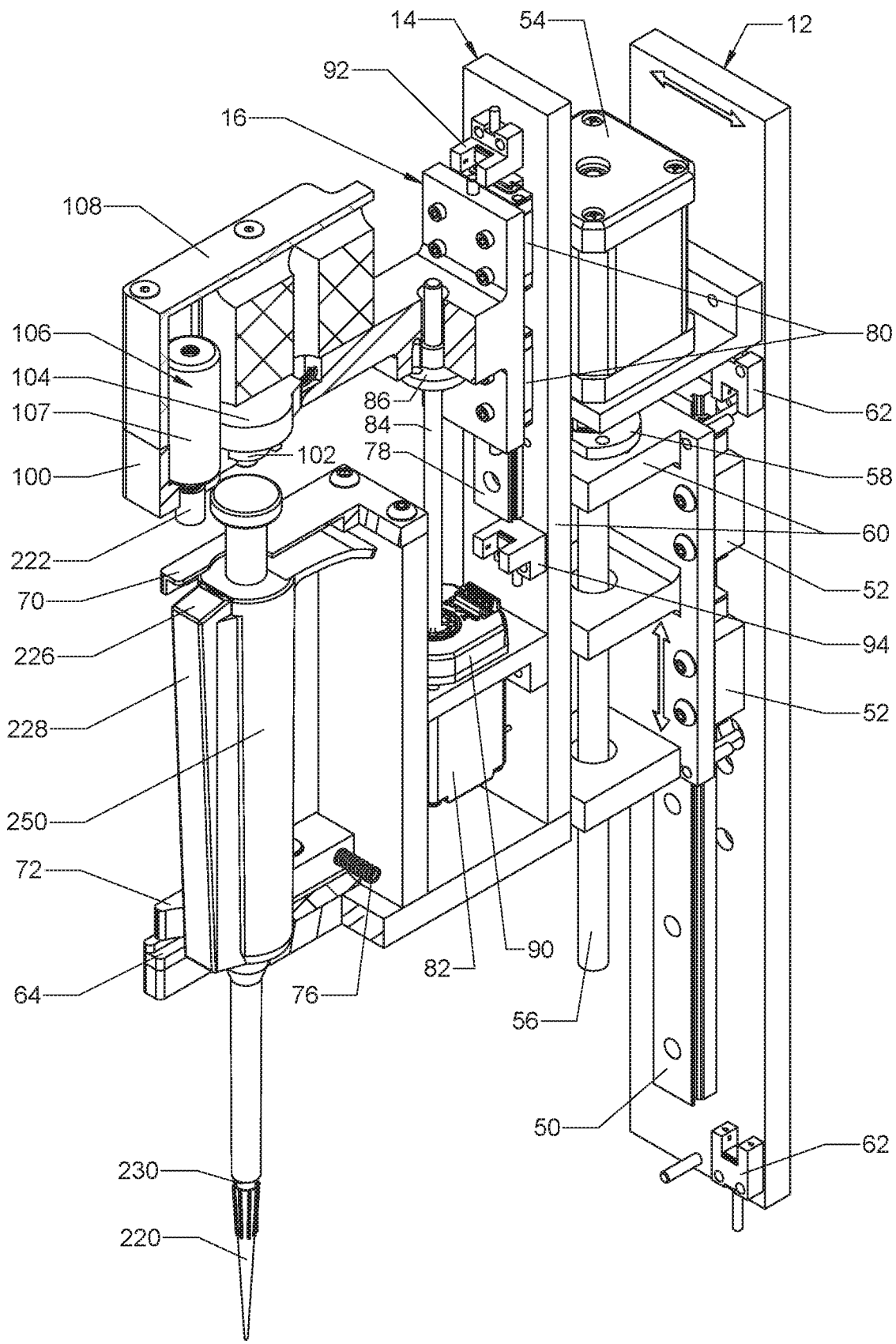
FIG. 4 is a perspective view of the actuator head assembly as it is attached to the head assembly but having the pipette activator opened so as to see some internal components of the present invention.
Figure 6:
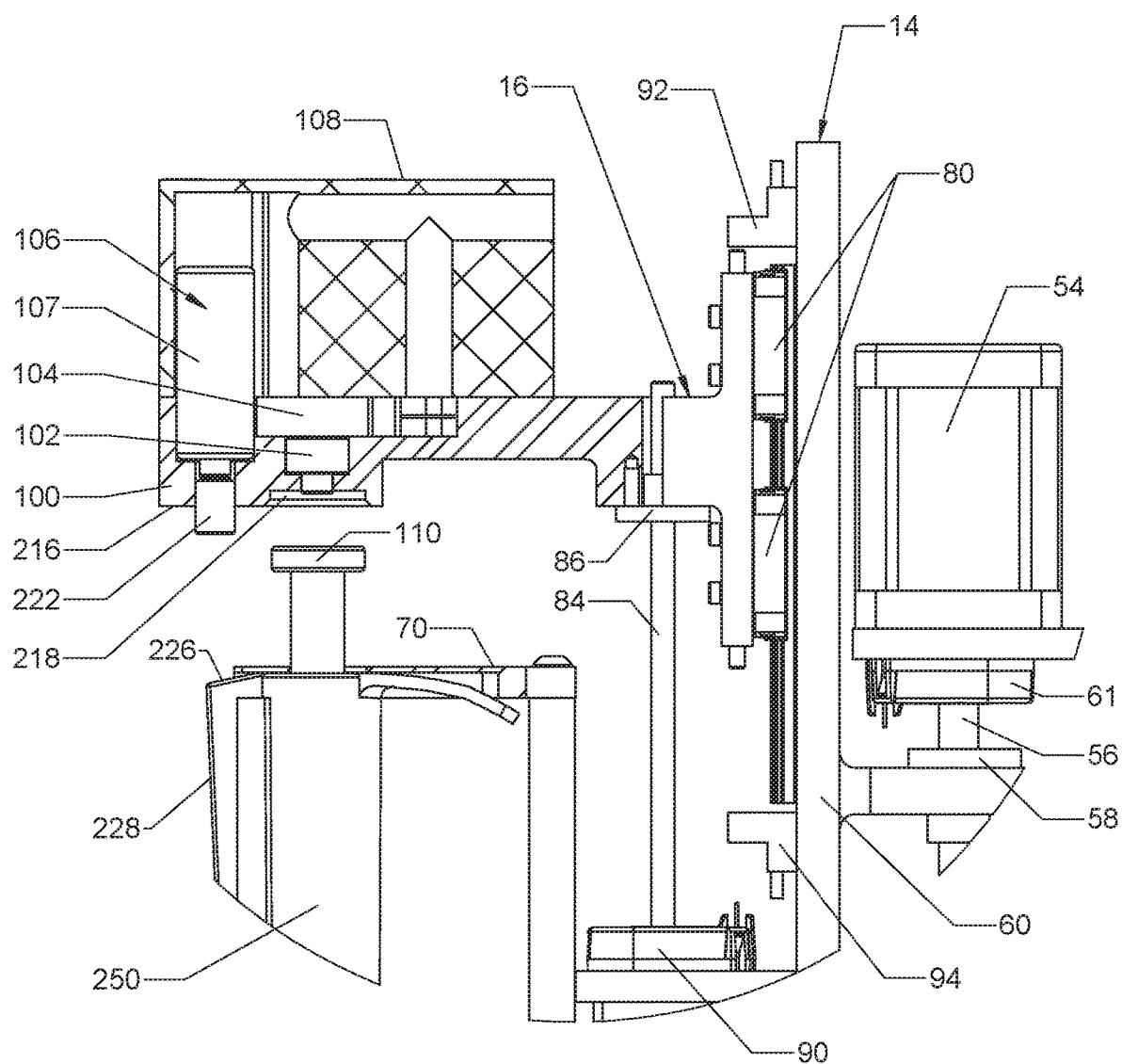
FIG. 6 depicts a sectional view of the pipette activator and the manual pipette of the present invention.

As shown in FIG. 4, the actuator head assembly 14 is attached to the head assembly 12 in a configuration that supports vertical movement. The actuator head assembly 14 moves vertically along a linear guide 50 by means of two slide bearings 52 which are inline mounted for rigidity. The vertical movement is driven by a third motor 54. Therefore, as the third motor 54 turns, it rotates a third lead screw 56 that is attached to a third lead screw nut 58 which is fixedly attached to an upright support 60. As shown in FIG. 6, a third encoder 61 interfaced with the third lead screw 56 records the rotational motion of the third motor 54 and the third lead screw 56. The recorded data is then used to calculate the linear position and speed of the actuator head assembly 14. A pair of third limit sensors 62 are interfaced with the respective ends of the path of travel of the actuator head assembly 14 to indicate the end of travel. The actuator head assembly 14 also provides a pipette holder to which the pipette 250 is removably attached.

Figure 5:
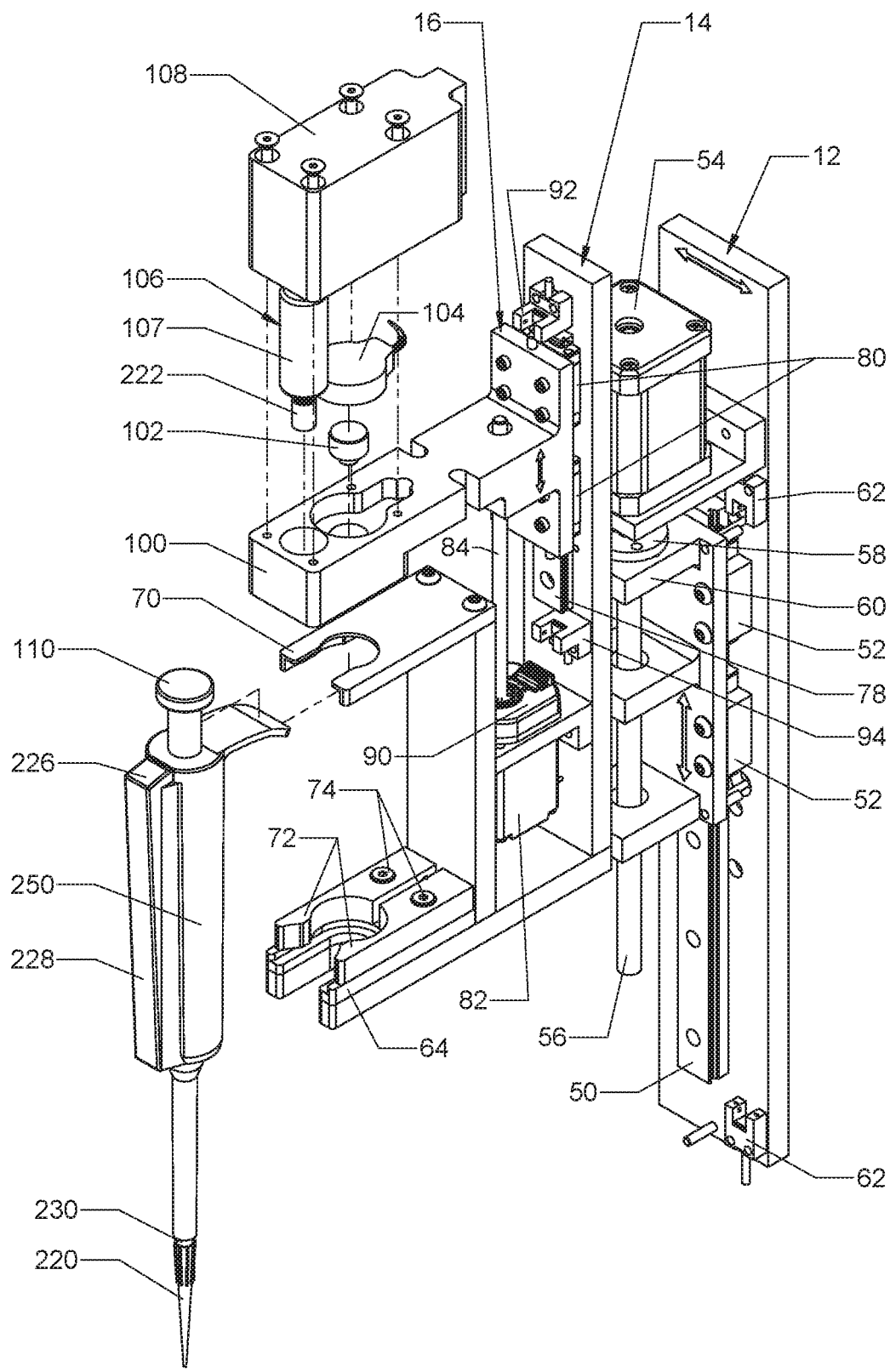
FIG. 5 depicts an exploded view of the pipette activator and the manual pipette of the present invention.

As shown in FIG. 5, the pipette activator 16 comprises an actuator arm 100, an insert 102, a load cell 104, a pipette tip ejector 106, and a cover 108. The cover 108 is securely fastened to the top of the actuator arm 100 so as to enclose the insert 102, the load cell 104, and the pipette tip ejector 106 therewithin. The actuator head assembly 14 supports the pipette activator 16 that is configured to move vertically along a linear guide 78 by means of two slide bearings 80 that are inline mounted for rigidity. The vertical movement is driven by a fourth motor 82 that rotates a fourth lead screw 84 that is attached to a fourth lead screw nut 86 rigidly fixed to the actuator arm 100. A fourth encoder 90 interfaced with the fourth lead screw 84 records the rotational motion of the fourth motor 82 and the fourth lead screw 84. The recorded data is then used to calculate the linear position and speed of the pipette activator 16. A pair of fourth limit sensors 92 and 94 are interfaced with the respective ends of the path of travel of the pipette activator 16 to indicate the end of travel.

As shown in FIGS. 4 and 6, the pipette tip ejector 106 comprises a solenoid 107 having a shaft and mounted securely to the actuator arm 100, and an ejector pin 222 that is attached to the shaft of the solenoid 107. The solenoid 107 in the present invention is normally maintained in the retracted position such that the ejector pin 222 is normally in the upper position. Actuation of the solenoid 107 displaces the ejector pin 222 vertically downward.

As shown in FIGS. 4 and 5, the pipette 250 is fixedly installed to a bottom plate 64 and a top plate 70 of the actuator head assembly 14. A spring-loaded gripper 72 is attached to the bottom plate 64 and comprising two finger-like elements that rotate around the center axis of fasteners 74. The pipette 250 is pushed in between the finger-like elements of the gripper 72 and on to the top plate 70 such that the pipette 250 is rigidly held therewithin. A spring 76 provides adequate resistance or force for the gripper 72 to hold the pipette 250 firmly upright in the actuator head assembly 14.

The microprocessor 300 then controls the solenoid 107 and all the motors 22, 38, 54, and 82. In essence, the microprocessor 300 functions to control the sequence of operations of each of these elements, and thus the interrelated movements of the platform assembly 10, the head assembly 12, the actuator head assembly 14, the pipette activator 16, and the pipette tip ejector 106. In addition, the microprocessor 300 monitors the movements and operation of the automated pipette manipulation system 500 of the present invention.

Hereinafter, an explanation of the methods of operation of the automated pipette manipulation system 500 of the present invention will be given.

In a nutshell, the operation of the automated pipette manipulation system 500 comprises the method and process of picking up and placing a pipette tip 220 from a rack 210 onto the pipette nozzle 230, moving the pipette 250 to a reservoir 212, extracting fluid therefrom, moving the pipette 250 to a microwell plate 214, dispensing the fluid therein, and finally ejecting the pipette tip 220 into a pipette tip disposable bin 208.

As shown in FIG. 5, a typical pipette 250 comprises a pushbutton 110 at the top of a stein that is spring-loaded and pushes against a piston, a nozzle 230 to which a pipette tip 220 is attached, and a tip ejector button 228 that is spring-loaded and ejects the pipette tip 220 by releasing it from its frictional engagement with the nozzle 230. Use of a pipette begins with the attachment of a pipette tip 220 to the nozzle 230. Then the pushbutton 110 is pressed downward so as to push against the resistance of the pipette spring until the piston is at its lowermost position. Then dipping the pipette tip 220 into a liquid. Then releasing the pushbutton 110 such that the resistance of the pipette spring forces it to move upwardly causing the liquid to be aspired into the pipette tip 220. Once the desired amount of liquid is aspired, the pushbutton 110 is held in place while the pipette tip 220 is removed from the liquid and the pipette 250 is moved over a tray or some tube into which the liquid is dispensed by pressing the pushbutton 110 downward until the piston is at its lowermost position. Finally, the tip ejector button 228 is pressed to eject or release the pipette tip 220 from the pipette 250.

Controlled by the microprocessor, the automated pipette manipulation system 500 of the present invention is able to operate a pipette 250 as described above. Furthermore, that which is novel of the automated pipette manipulation system 500 of the present invention, is the method and process of controlling and measuring the amount of liquid that is aspired and dispensed, as explained below.

First, the automated pipette manipulation system 500 of the present invention manipulates the pipette 250 such that a pipette tip 220 is attached to the nozzle 230. Second, the fourth motor 82 is activated to displace the pipette activator 16 downward. As shown in FIG. 6, the bottom surface 216 of the actuator arm 100 has a tapered circular recess 218 that guides the actuator arm 100 onto the pushbutton 110 of the pipette 250 as the actuator mechanism 16 is displaced downwardly. Third, as the pipette activator 16 is further displaced downwardly, the pushbutton 110 presses against the insert 102 which is then pushed against the load cell 104. Fourth, as the pipette activator 16 is further displaced downwardly, the load cell 104 senses changes in electrical signal and sends stream of data to the microprocessor 300 that uses the data to calculate the force exerted against the pushbutton 110. Fifth, as soon as the force exerted against the pushbutton 110 is greater than zero, the automated pipette manipulation system 500 of the present invention marks or identifies the corresponding vertical location of the pipette activator 16 as the starting point. Sixth, the fourth motor 82 is deactivated so as to stop the displacement of the pipette activator 16 at a predetermined distance from the starting point that directly relates to the predetermined volumetric amount of liquid that would be aspired by the pipette 250 when the pushbutton 110 is released. Seventh, the automated pipette manipulation system 500 of the present invention manipulates the pipette 250 such that the pipette tip 220 is dipped into a desired liquid. Eighth, the pipette activator 16 is displaced upwardly so that the pushbutton 110 is released and forced upwardly by the resistance of the pipette spring. The upward force exerted on the pushbutton 110 by the resistance of the spring causes the piston to be displaced upward, which then causes the liquid to be aspired into the pipette tip 220. Ninth, the automated pipette manipulation system 500 of the present invention manipulates the pipette such that the liquid is dispensed into a desired location by the downward movement of the pipette activator 16. Finally, the solenoid 107 is activated to displace the ejector pin 222 downward until it exerts pressure against the top surface 226 of the tip ejector button 228 of the pipette 250. This then causes the pipette 250 to release the pipette tip 220 from its frictional engagement with the nozzle 230. It is also noteworthy that a motor and lead screw arrangement can be used instead of a solenoid to drive the pipette tip ejection system.

In an alternative embodiment of the automated pipette manipulation system 500 of the present invention, the fourth motor 82 is deactivated so as to stop the displacement of the pipette activator 16 when the load cell 104 records a predetermined amount of force exerted against the pushbutton 110. Since the pushbutton 110 is spring-loaded, the force exerted against it is proportional to the distance displaced. This linear relationship between the force and distance is dependent on the stiffness of the pipette spring. The predetermined distance of displacement by the piston directly relates to predetermined volumetric amount of liquid that would be aspired by the pipette 250 when the pushbutton 110 is released.

However, in the preferred embodiment of the automated pipette manipulation system 500 of the present invention, the volumetric measurement of the liquid aspired into the pipette tip 220 is done by using the load cell 104 to determine the starting point and using the fourth encoder 90 interfaced with the fourth lead screw 84 and the fourth motor 82 to measure the distance that the pipette activator 16 is displaced until the fourth motor 82 is deactivated when the pipette activator 16 is displaced a predetermined distance corresponding to a predetermined volumetric measurement.

With the configuration described above, the automated pipette manipulation system 500 of the present invention allows for a pipette 250 to be manipulated so as to aspire and dispense an accurate volume of liquid in a laboratory setting. Furthermore, the configuration described above allows for the automated pipette manipulation system 500 of the present invention to operate with a wide range of manual pipettes that are commercially available and manufactured by third-parties. Despite varying sizes and heights, different pipettes can be used with the automated pipette manipulation system 500 of the present invention because the pipette activator 16 can be moved high enough to accommodate any commercially available pipette 250 and then calibrated for a particular pipette 250 by the process of using the load cell 104 to establish the starting point, as described above.

Furthermore, the use of a load cell 104 to establish the starting point and subsequently tracking the displacement of the pushbutton 110 via the fourth encoder 90 interfaced with the fourth lead screw 84 and the fourth motor 82, allows the automated pipette manipulation system 500 of the present invention to aspire and dispense varying volume of liquid without re-sizing or changing the settings in the pipette 250.

Most commercially available pipettes 250 have pistons that can be moved upward or downward so as to set a predetermined volume. Once the volume is set, displacing the pushbutton 110 to the lowest position ensures that the pipette 250 will aspire the set volume of liquid. Other pipette manipulation systems commercially available always displace the pushbutton 110 to its lowest point so that a preset volume of liquid is aspired and dispensed. The disadvantage of said systems is that the operator is required to always manually set the volume of the pipette 250 before each use. Such task, especially when done repeatedly, can be cumbersome, inefficient, and susceptible to human error. The automated pipette manipulation system 500 of the present invention, however, eliminates this disadvantage by its use of the load cell 104 in conjunction with the fourth encoder 90 interfaced with the fourth lead screw 84 and the fourth motor 82 to aspire and dispense a predetermined volume of liquid without changing the volume settings of the pipette 250.

Alternatively, the automated pipette manipulation system 500 of the present invention can be used to aspire the maximum amount of volume of liquid and dispense partially in multiple areas. With this methodology, the pipette activator 16 is first displaced down to its lowest point. Second, the pipette tip 220 is dipped into a desired liquid. Third, the pipette activator 16 is displaced upwardly so that the pushbutton 110 is released and forced upwardly by the resistance of the pipette spring. The upward force exerted on the pushbutton 110 by the resistance of the pipette spring causes the piston to be displaced upward, which then causes the liquid to be aspired into the pipette tip 220. Fourth, the starting point is marked or identified as described above by use of the load cell 104. Fifth, the automated pipette manipulation system 500 of the present invention manipulates the pipette such that the liquid is dispensed into various desired locations by the downward movement of the pipette activator 16. In essence, at the first location, the pipette activator 16 is displaced downward a predetermined distance from the starting point that directly relates to the predetermined volumetric amount of liquid that would be dispensed by the pipette 250 at the first location. Then, the process is repeated at the second and subsequent locations until all the liquid in the pipette tip 220 is dispensed.

Calibration of the automated pipette manipulation system 500 of the present ion is accomplished by reference to a library of pipette specifications stored in the microprocessor 300. The library includes specifications related to the correlation of volume of liquid aspired and the distance that the pushbutton 110 or piston is displaced. Reference to the library enables the automated pipette manipulation system 500 of the present invention to use any commercially available pipette 250 and aspire or dispense an accurate volume of liquid required by the user. Alternatively, the automated pipette manipulation system 500 of the present invention allows for its calibration with any pipette 250 not found in the library.

It is understood that the described embodiments of the present invention are illustrative only, and that modifications thereof may occur to those skilled in the art. Accordingly, this invention is not to be regarded as limited to the embodiments disclosed, but to be limited only as defined by the appended claims herein.

What is claimed is:

1. An automated pipette manipulation system comprising:
   a pipette that is commercially available separate from said pipette manipulation system and having a pushbutton and a tip ejector button;
   an actuator head assembly that is movable only in the vertical direction; and having a pipette holder to which said pipette is removably attached;
   a pipette activator that is movable only in the vertical direction to displace said pushbutton of said pipette, and comprising a load cell and a solenoid;
   wherein said solenoid displaces said tip ejector button of said pipette to eject a pipette tip from said pipette;
   wherein said load cell establishes a starting point of said displacement of said pushbutton; and
   wherein said pipette activator displaces said pushbutton downward a predetermined distance past said starting point that corresponds to a predetermined volume of a liquid aspired or dispensed by said pipette.

2. The automated pipette manipulation system of claim 1 wherein said actuator head assembly is movable by a first motor interfaced with a first encoder that senses the movement of said actuator head assembly; and wherein said pipette activator is movable by a second motor interfaced with a second encoder that senses the movement of said pipette activator.

3. The automated pipette manipulation system of claim 1 further comprising a microprocessor that controls the movement of said actuator head assembly and said pipette activator.

4. The automated pipette manipulation system of claim 1 wherein said pipette activator displaces said pushbutton further after dispensing said liquid from said pipette so as to purge any residual left in said pipette.

5. An automated pipette manipulation system comprising:
   a pipette that is commercially available separate from said pipette manipulation system and having a pushbutton and a tip ejector button;
   a platform assembly that is movable horizontally along a first linear guide;

a head assembly that is movable horizontally along a second linear guide that is transverse to said first linear guide;

an actuator head assembly that is attached to said head assembly; that is movable vertically along a third linear guide; and having a pipette holder to which said pipette is removably attached;

a pipette activator that is movable vertically along a fourth linear guide to actualize a downward displacement of said pushbutton of said pipette and comprising a load cell and a solenoid;

wherein said solenoid displaces said tip elector button of said pipette to eject a pipette tip from said pipette;

wherein said load cell establishes a starting point of said downward displacement of said pushbutton; and wherein said motor displaces said pushbutton downward a predetermined distance past said starting point that corresponds to a predetermined volume of a liquid aspired or dispensed by said pipette.

6. The automated pipette manipulation system of claim 5 further comprising a microprocessor that controls the movement of said platform assembly, said head assembly; said actuator head assembly; and said pipette activator.

7. The automated pipette manipulation system of claim 5 wherein said pipette activator displaces said pushbutton further after dispensing said liquid from said pipette so as to purge any residual left in said pipette.

8. An automated pipette manipulation system comprising:
a pipette having a pushbutton;

a platform assembly that is movable horizontally along a first linear guide;

a head assembly that is movable horizontally along a second linear guide that is transverse to said first linear guide;

an actuator head assembly that is attached to said head assembly; and that is movable vertically along a third linear guide; and having a pipette holder to which said pipette is removably attached;

a pipette activator that is movable vertically along a fourth linear guide to actualize a downward displacement of said pushbutton of said pipette and comprising a load cell and a motor;

wherein said load cell establishes a starting point of said downward displacement of said pushbutton;

wherein said motor displaces said pushbutton downward a predetermined distance past said starting point that corresponds to a predetermined volume of a liquid aspired or dispensed by said pipette; and wherein said platform assembly is movable by a first motor interfaced with a first encoder that senses the movement of said platform assembly; wherein said head assembly is movable by a second motor interfaced with a second encoder that senses the movement of said head assembly; wherein said actuator head assembly is movable by a third motor interfaced with a third encoder that senses the movement of said actuator head assembly; and wherein said pipette activator is movable by a fourth motor interfaces with a fourth encoder that senses the movement of said pipette activator.

9. An automated pipette manipulation system comprising:
a pipette that is commercially available separate from said pipette manipulation system and having a pushbutton and a tip ejector button;

a pipette activator that is movable to displace said pushbutton of said pipette, and comprising a load cell and a solenoid;

wherein said solenoid displaces said tip ejector button of said pipette to eject a pipette tip from said pipette;

wherein said load cell establishes a starting point of said displacement of said pushbutton; and wherein said pipette activator displaces said pushbutton downward a predetermined distance past said starting point that corresponds to a predetermined volume of a liquid aspired or dispensed by said pipette.

* * * * *